Aug. 21, 1951  M. G. MARTLING  2,564,704
TELESCOPE OPTICAL SYSTEM FOR STABILIZING OBSERVED IMAGES
Filed May 21, 1947  9 Sheets-Sheet 1

Inventor
Merrifield G. Martling

Inventor
Merrifield G. Martling

Inventor
Merrifield G. Martling
By
Attorney

Inventor
Merrifield G. Martling
By

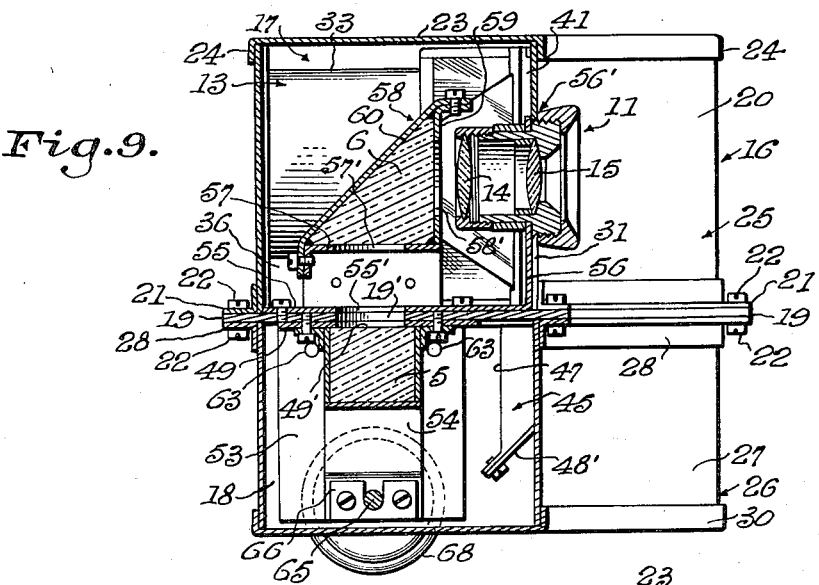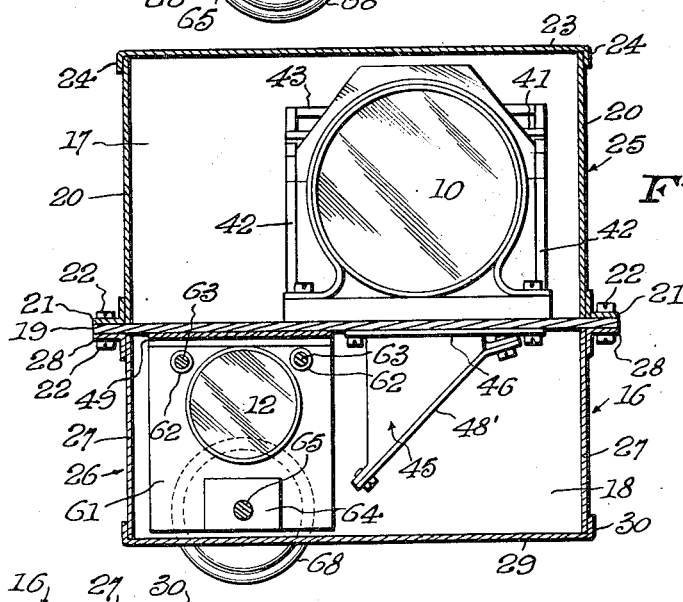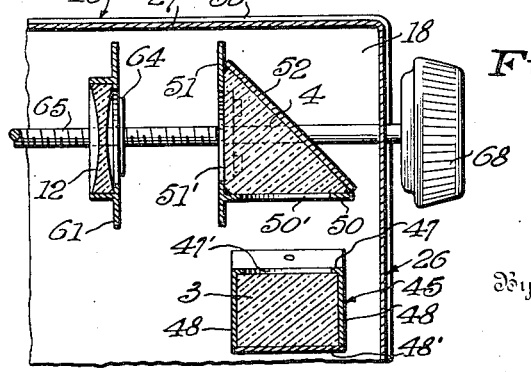

Aug. 21, 1951 M. G. MARTLING 2,564,704
TELESCOPE OPTICAL SYSTEM FOR STABILIZING OBSERVED IMAGES
Filed May 21, 1947 9 Sheets-Sheet 6

INVENTOR
Merrifield G. Martling

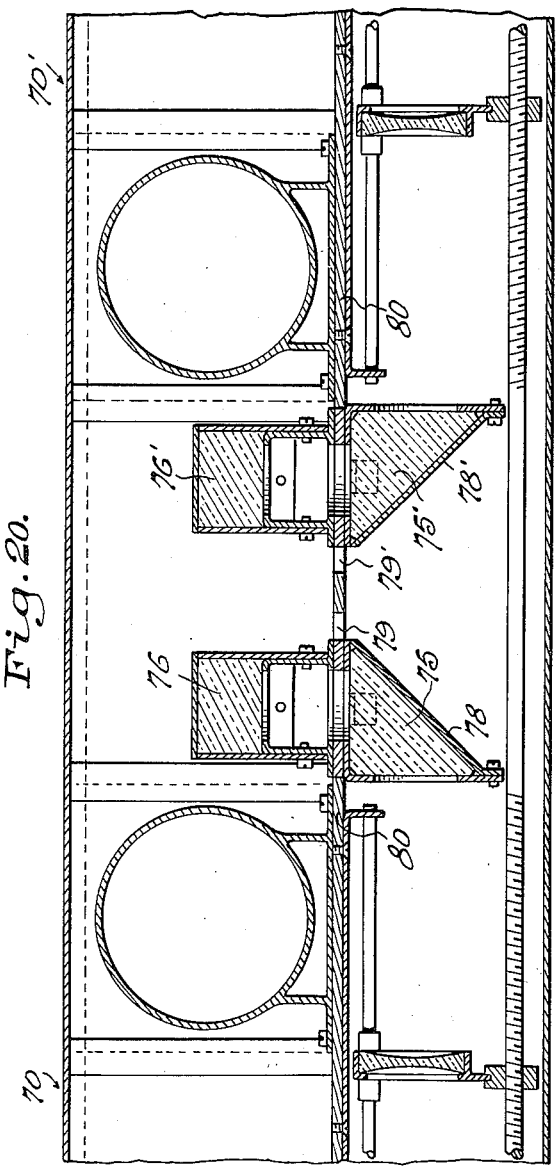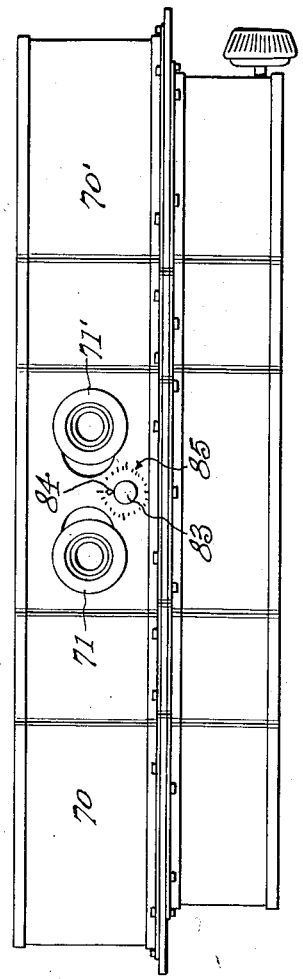

Aug. 21, 1951   M. G. MARTLING   2,564,704
TELESCOPE OPTICAL SYSTEM FOR STABILIZING OBSERVED IMAGES
Filed May 21, 1947   9 Sheets-Sheet 8
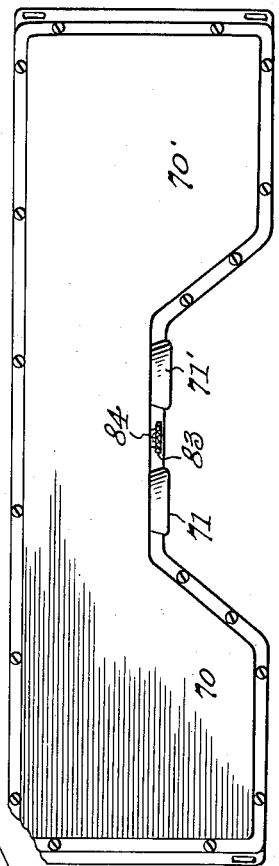
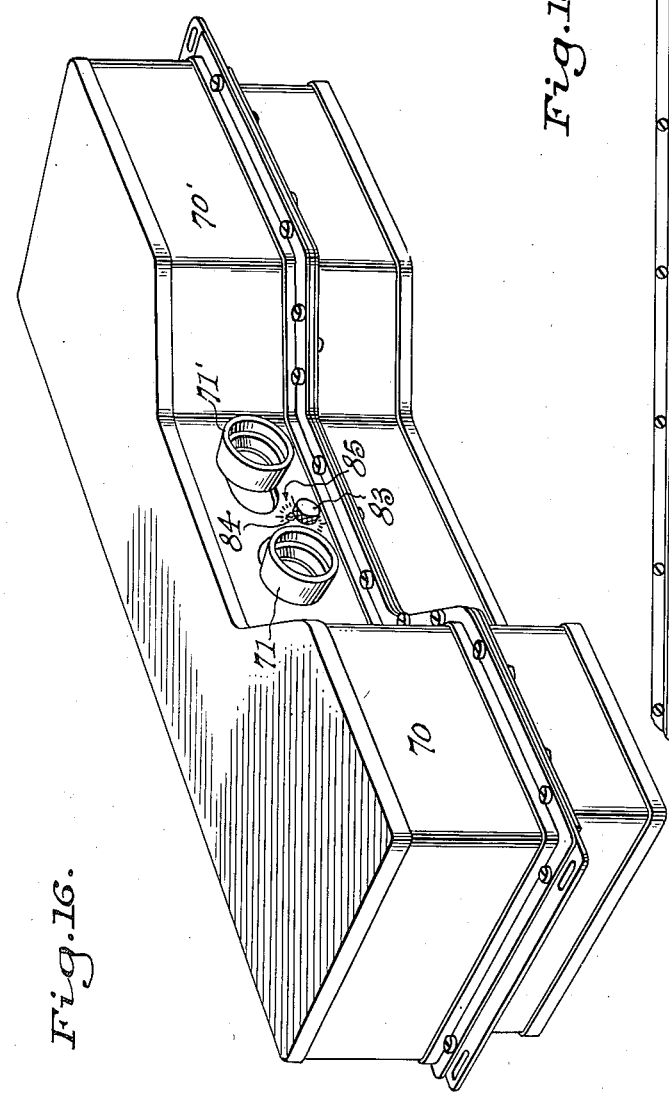
Inventor
Merrifield G. Martling
By
Attorneys Aug. 21, 1951 M. G. MARTLING 2,564,704
TELESCOPE OPTICAL SYSTEM FOR STABILIZING OBSERVED IMAGES
Filed May 21, 1947 9 Sheets-Sheet 9

Inventor
Merrifield G. Martling
By
Attorneys

Patented Aug. 21, 1951

2,564,704

UNITED STATES PATENT OFFICE 2,564,704

TELESCOPE OPTICAL SYSTEM FOR STABILIZING OBSERVED IMAGES

Merrifield G. Martling, United States Army, assignor, by decree of distribution, to Agnes H. Martling Application May 21, 1947, Serial No. 749,605

1 Claim. (Cl. 88—32)

(Granted under the act of March 3, 1883, as amended April 30, 1928; 370 O. G. 757)

The invention described herein may be manufactured and used by or for the Government for governmental purposes, without payment to me of any royalty thereon.

This invention relates to optical instruments and particularly to telescopes, binoculars, microscopes, cameras, projectors and the like.

One important function of an optical instrument is to form an enlarged or reduced image of a distant object in a particular plane or warped surface which may or may not be subject to examination by other parts of the system. A major problem in the use of optical instruments arises from the difficulty of providing stable support. When conventional instruments are supported by human hands alone, natural or abnormal trembling, breathing, heartbeats, and voluntary or involuntary muscular tremors introduce erratic movements of the image. These become of such material movement as to be objectionable as the power of the instrument increases and restricts the power of hand supported instruments to low powers.

Even when rigid mechanical support, such as a tripod, is employed, wind, passing vehicles and other sources of vibration introduce in conventional instruments reactions on the image displayed that also limit the power of magnification for practical use. These disadvantages and limitations are brought about by the optical systems currently designed for such instruments.

The absence of a stable presentation of the object observed or any tendency to reduce its lucidity or distort the image is a disadvantage and limitation that materially affects the capacity of the instrument involved for useful and efficacious results.

It is therefore an object of this invention to provide a new and improved optical instrument that avoids one or more of the disadvantages and limitations of the previous art.

It is another object of the present invention to provide a new and improved optical instrument that will have an optical system capable of minimizing the tendency to induce a wandering image or tremulous display of the object being examined to the eye of the observer.

Still another object of the invention described herein is to provide a new and improved optical instrument that will employ an optical system in which the nodal point thereof will be brought into optical coincidence with the eyepoint, or viewpoint locus such as photographic film, camera plate, photocell or other register of a display whereby angular variation of the instrument structure will maintain the image and hold it stable.

An additional object of this invention is to provide a new and improved optical instrument that will include an optical system that will keep the image of the object under observation relatively steady and visually clarified and lucid under the severest natural conditions experienced in the practical use of the optical instrument involved.

For a better understanding of the invention and additional objects thereof, reference is hereby made to the appended drawings, showing the application of the invention to a telescope and binoculars and the description following by way of an example while the scope of the invention is particularly pointed out in the claim.

In the drawings accompanying this specification:

Figure 9 is a transverse sectional elevation taken on line 9—9 of Figures 3 and 4;

Figure 10 is a transverse sectional elevation on line 10—10 of Figures 3 and 4;

Figure 11 is a sectional detail taken on line 11—11 of Figure 4;

Figure 14 is a front elevation showing a binocular form of the improved optical instrument;

Figure 15 is a plan view of the binocular instrument shown in Figure 14;

Figure 16 is a perspective view of the binocular instrument;

Figure 20 is a fractionized sectional elevation taken on the line 20—20 of Figure 17.

Similar reference characters refer to similar parts throughout the drawings. In this invention the quality of the image is considered of primary importance. To produce this the optical system is designed to bring about an image which is stable and is physiologically and psychologically satisfactory.

In a particular form of this invention, an optical instrument comprises a housing, an optical system arranged within the housing and including an objective lens, a focusing lens and an eyeview locus element. It also has means coordinating with the optical systems to produce coincidence of a nodal point of said system with its eye view locus to deliver a steady and comprehensive image to a user of this instrument.

It can be appreciated that the optical instrument could be a telescope, binocular, microscope, camera and other apparatus for increasing or decreasing the magnification of an object and presenting the image to an eyepiece or eyeview locus. The eyeview locus is a term used to include an eye, a screen tube, photocell, camera plate or whatever particular purpose is involved in connection therewith.

In discussing the present invention attention is called to the fact that there are two optical points for each system of lenses about which the system may be rotated without displacement of the image. These are called the nodal points.

If either of these nodal points be brought into coincidence with the eyepoint of the telescope, angular movement of the telescope will not affect the image, which will remain stationary. This is done by the arrangement of the prisms and lenses. The nodal point can be made to coincide with the eyepoint or eyeview locus in an almost unlimited number of ways depending upon the arrangement and characteristics of the prisms used. It can also be done with mirrors and other light conducting elements within the spirit of this invention. The prisms not only serve to bring the selected nodal point to the vicinity of the eyepoint but also erect the image.

Briefly stated, the invention relates to the construction of telescopes, binoculars, microscopes, cameras and the like embodying an objective, a train of optically associated refracting or reflecting surfaces including an image erecting system whereby the light ray is folded upon itself, and directed into an ocular element arranged with respect to the objective so that the eyepoint or eyeview locus and nodal point of the system are substantially coincident.

In the construction of the illustrated telescope or binocular, the optical system is arranged in two planes having the objective lens in one plane and the eyepiece in the other, and the entire optical system, exclusive of the objective lens and the eyepiece, is completely enclosed within a housing to exclude dust from the prisms and lens surfaces and to form a support for the various parts of the apparatus.

The housing is separated into an upper and a lower compartment by a partition upon which are mounted the eyepiece, the objective lens, the prisms, and the focusing lens, so that when the covers of the upper and lower compartments are removed these parts will remain in alignment.

Figure 13:
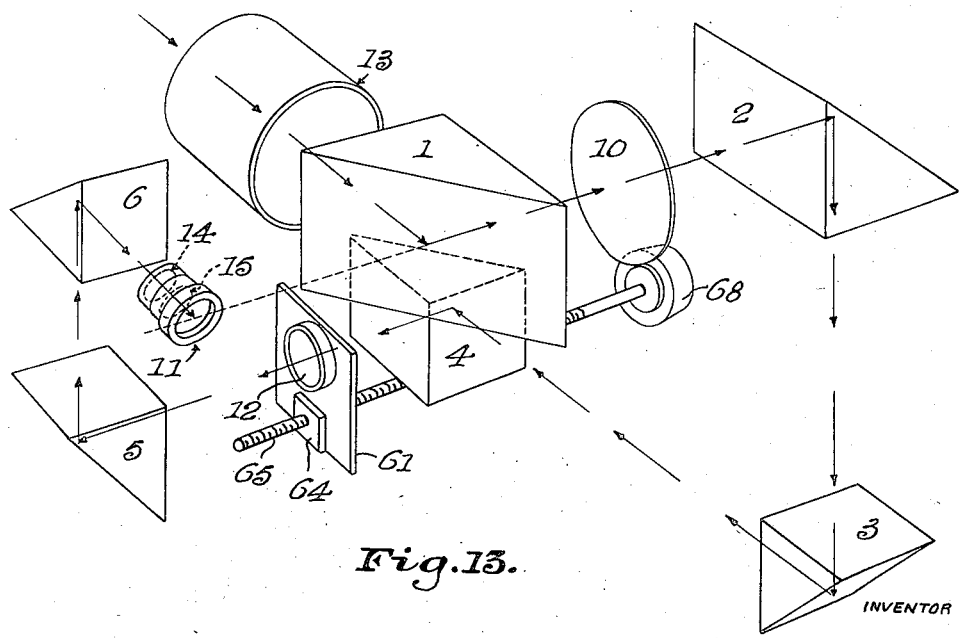
Figure 13 is a schematic view of the optical system used on this embodiment.
Figures 17, 18:
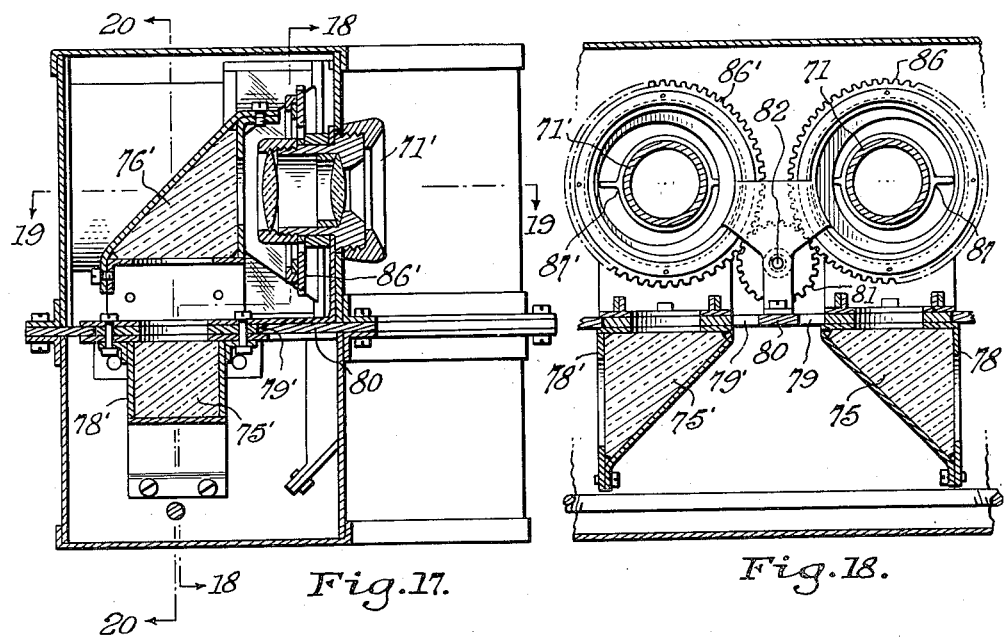
Figure 17 is a transverse sectional elevation of the binocular form of the device, the view being similar to that shown in Figure 9.
Figure 18 is a sectionalized elevation taken on the line 18—18 of Figure 17.
Figure 19:
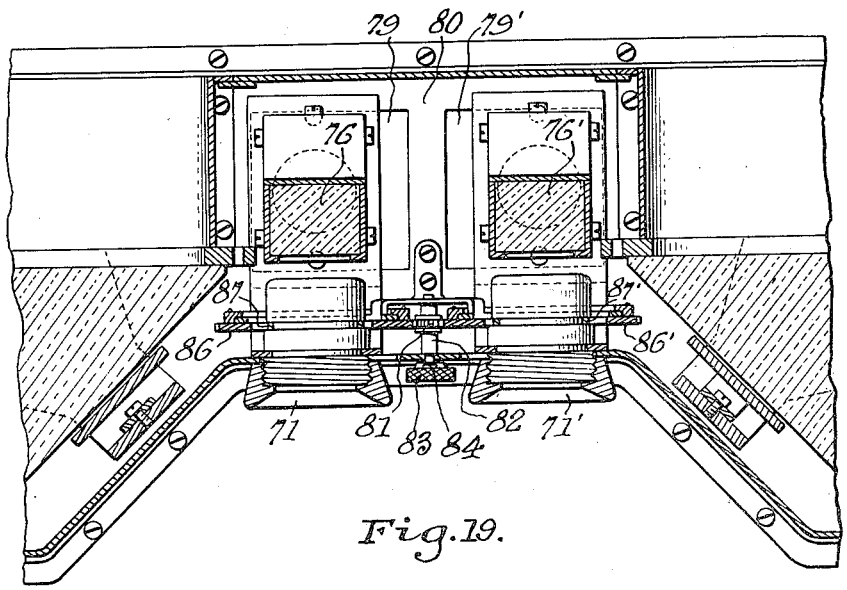
Figure 19 is a fractionized sectional plan view taken on the line 19—19 of Figure 17.

The optical system of the telescope, as shown in the illustrations, comprises an objective lens 10, an eyepiece 11, a focusing lens 12, and a combination of six prisms. As shown in Fig. 13, prism 1 is placed adjacent the cylindrical entrance shade member or objective tube 13, the objective lens 10 is placed between prisms 1 and 2, prisms 3 and 4 are placed intermediate the prism 2 and focusing lens 12, and prisms 5 and 6 are placed intermediate the focusing lens 12 and the eyepiece 11, in which are mounted lenses 14 and 15.

Figure 1:
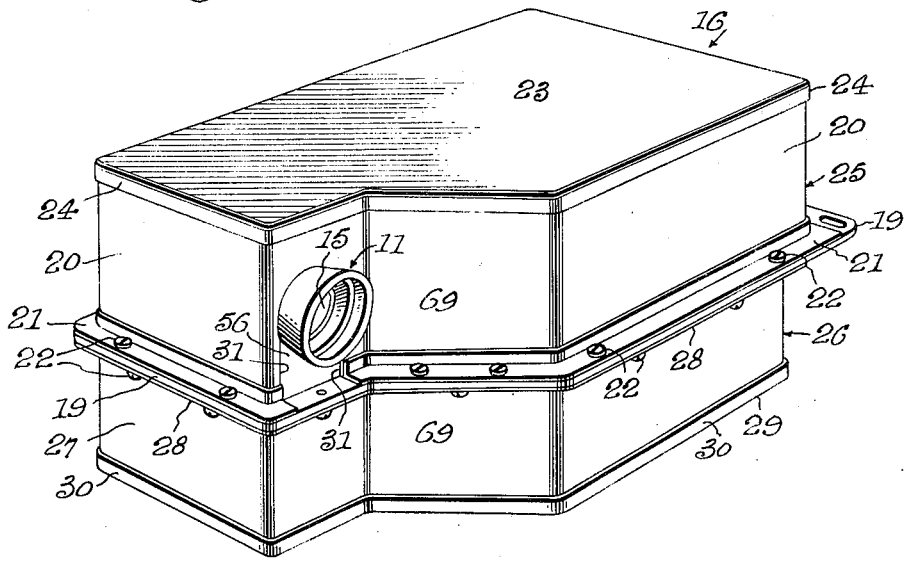
Figure 1 is a perspective view of a prism telescope housing embodying this invention.
Figure 2:
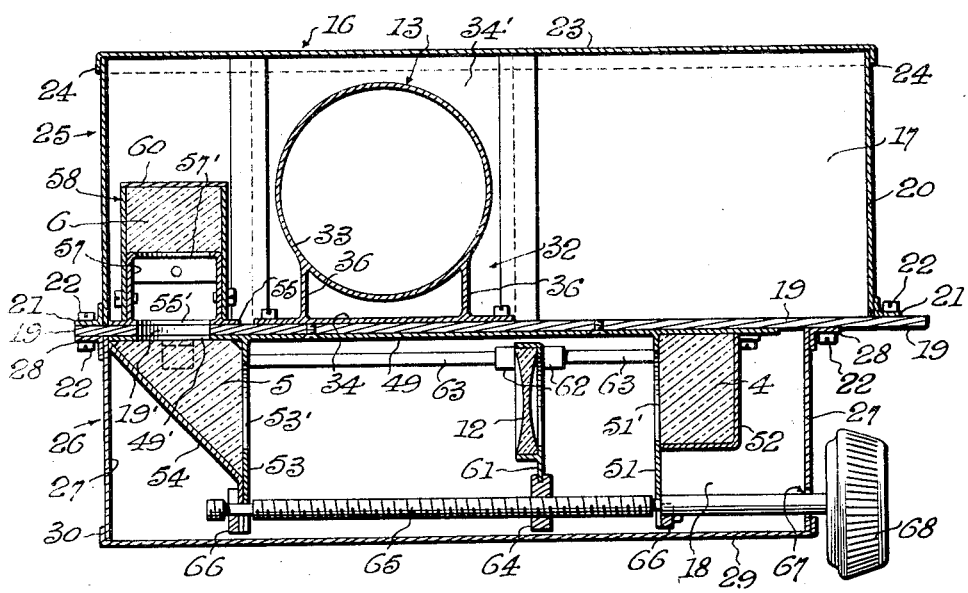
Figure 2 is a sectional elevation taken longitudinally on line 2—2 of Figures 3 and 8.

Referring to Figs. 1 and 2, the numeral 16 indicates the entire casing or housing of the telescope which is divided into upper and lower compartments 17 and 18 by a base plate or partition 19. The upper compartment 17 is formed by a surrounding wall 20 provided with a flange 21 which is attached to the partition by the screws 22. A lid 23 is provided with an encircling flange 24 which is welded or otherwise suitably attached to the wall 20 to form a top housing or cover 25 for the upper portion of the instrument. A bottom housing 26 consisting of an encircling wall 27 is provided with a flange 28 and a lid 29. The lid 29 has a flange 30 which is welded to the wall. The flange 28 of the wall 27 is attached to the lower surface of the base plate or partition 19 by means of screws 22.

Figure 3:
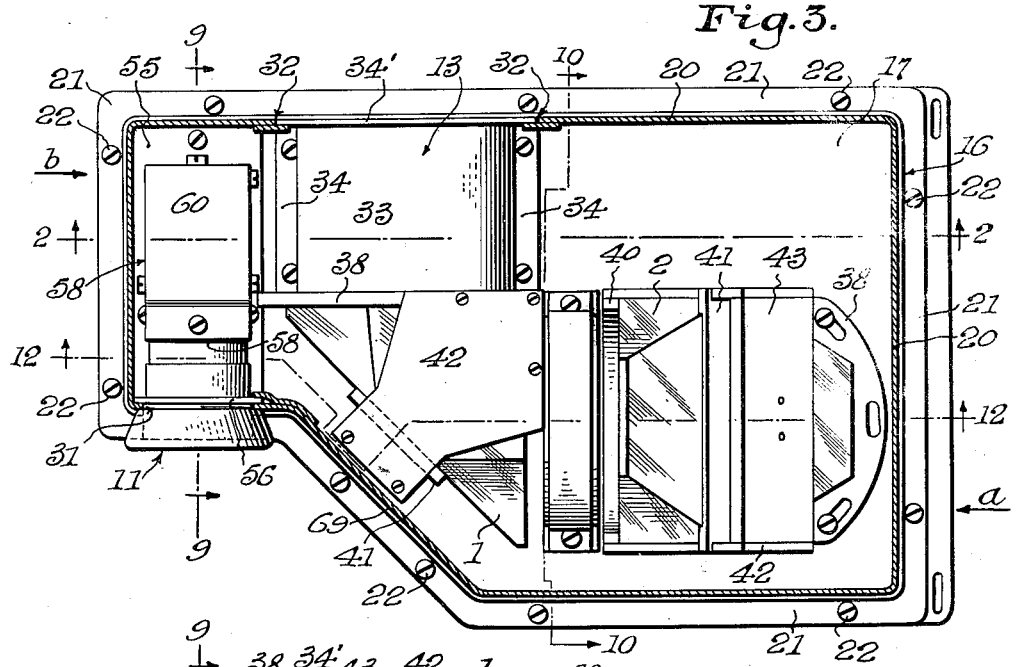
Figure 3 is a plan view of the telescope indicated in Figure 1 with the upper lid removed.
Figure 4:
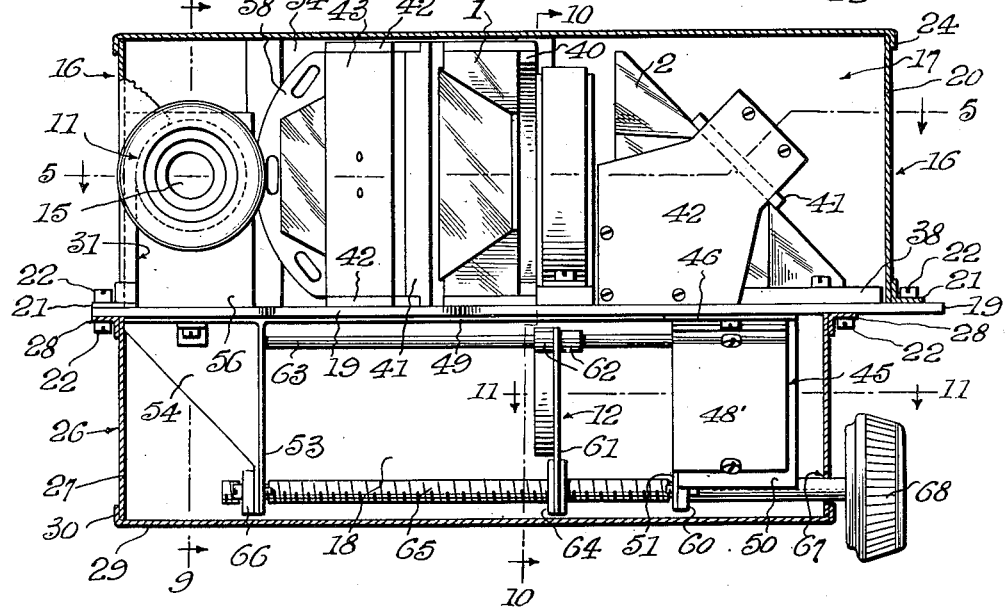
Figure 4 is a longitudinal elevation on Figure 1 with portions of the wall of the housing removed.
Figure 5:
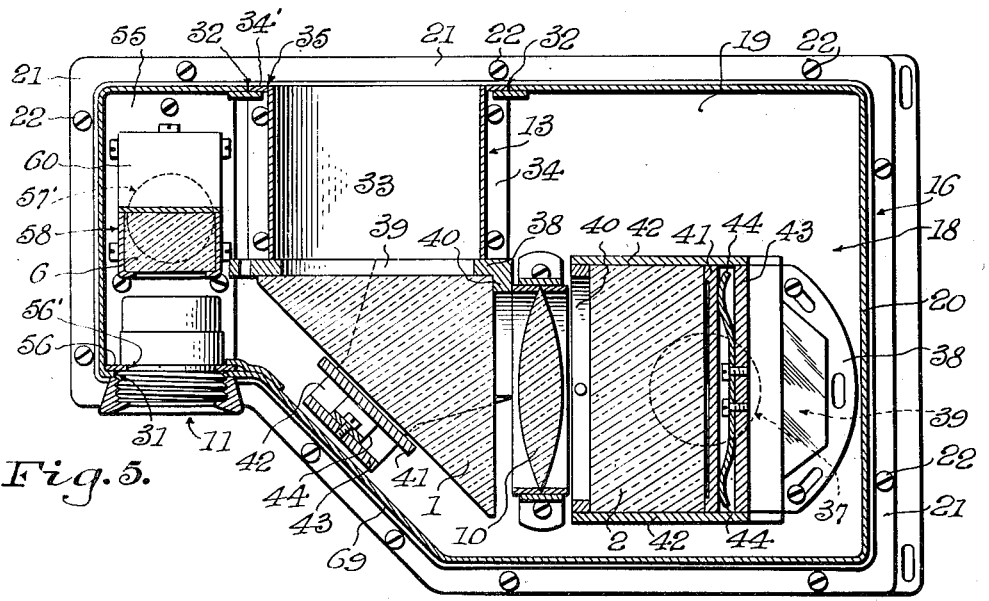
Figure 5 is plan view in section taken on the line 5—5 of Figure 4.
Figure 6:
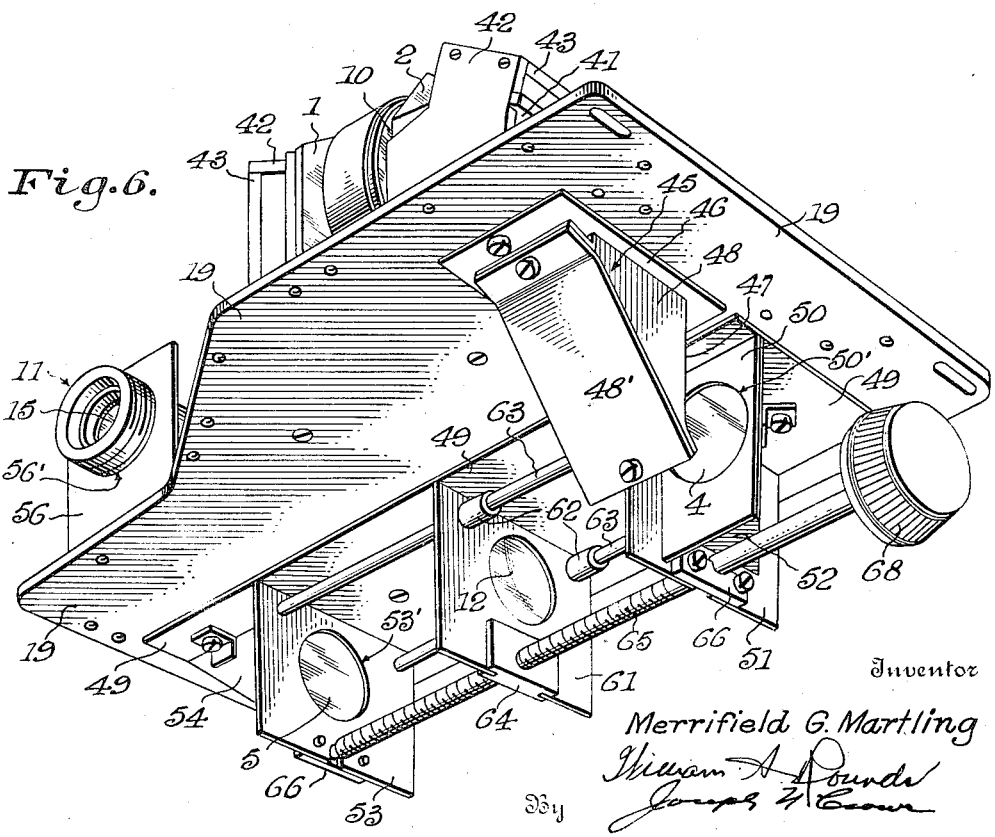
Figure 6 is a view in perspective of the internal mechanism of the telescope.
Figure 7:
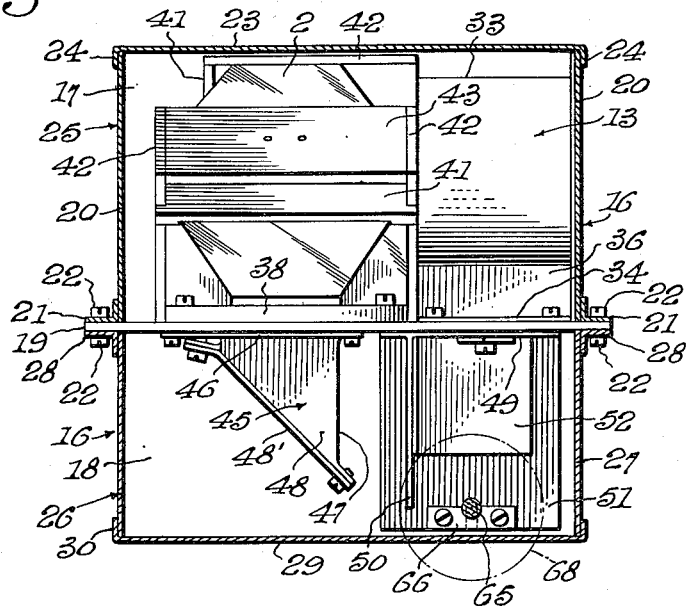
Figure 7 is a transverse sectional elevation taken on line 7—7 of Figure 2.
Figure 8:
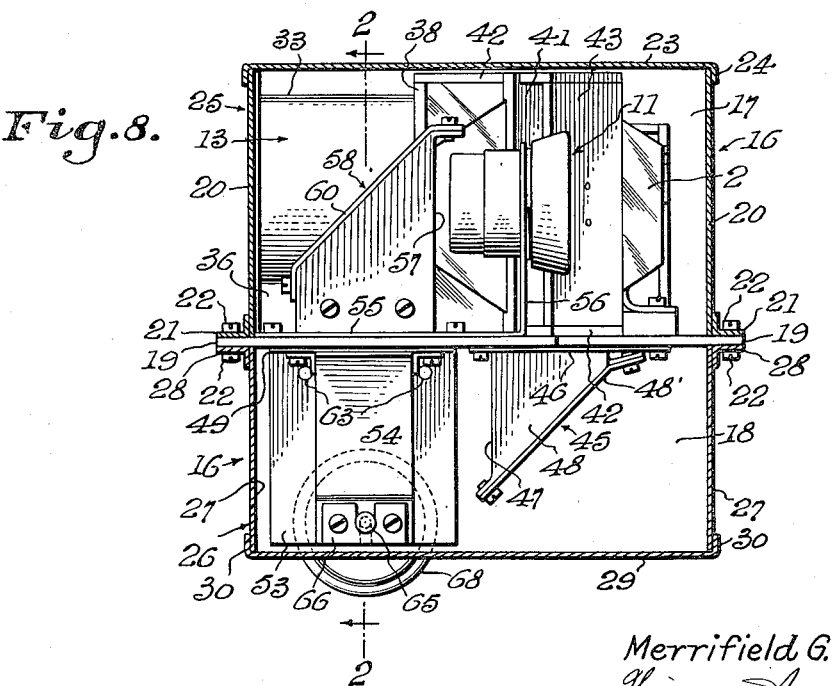
Figure 8 is a transverse sectional elevation taken on line 8—8 of Figure 3.
Figure 12:
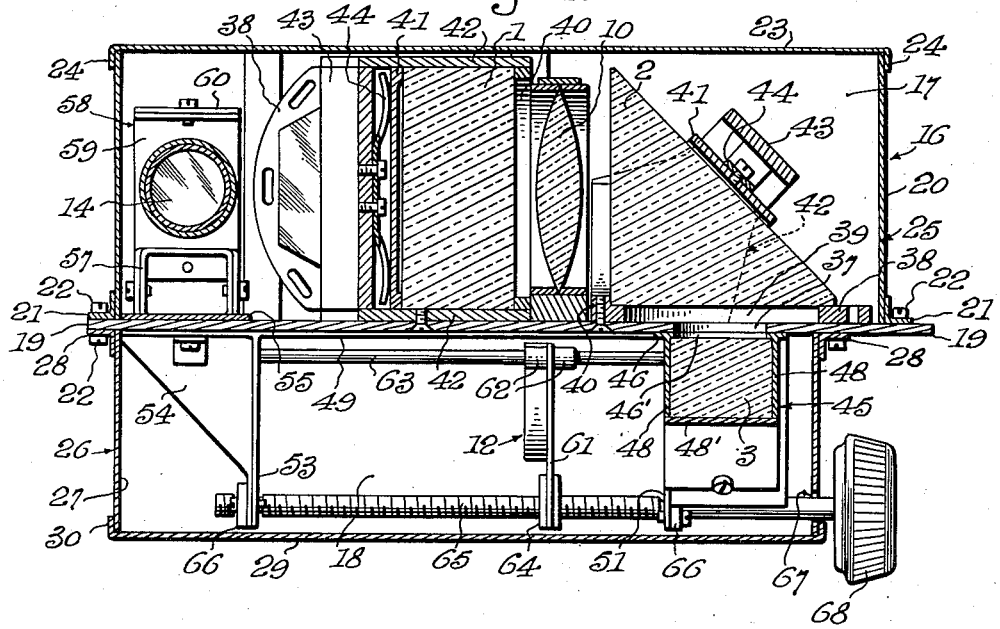
Figure 12 is a longitudinal section taken on the line 12—12 of Figure 3.

The top housing or cover 25 is provided with a slot 31 through which the eyepiece 11 projects, and a rectangular opening 32 (Fig. 3) through which the object is viewed.

Within the interior of the top housing 25 are located an entrance or sunshade 13, pre-objective prism 1, objective lens 10, post-objective prism 2, ocular prism 6, and eyepiece or ocular 11; and the lower cover houses deflecting prism 3, focusing lens prism 4, focusing lens 12 and ocular deflecting prism 5, the various elements being arranged in the order shown in Fig. 13.

The sunshade 13 comprises a tubular shield 33 which is mounted upon an angular support member comprising a flat base 34 which is screwed to the base plate or partition 19 and an upright plate 34' provided with a central opening 35 into which snugly fits the forward edge of the cylindrical shield 33. The shield 33 is braced by the webs 36 which connect it to the base 34.

At the rear of the light shade 13 is mounted the right angle pre-objective prism 1 which reflects rays passing through the shade horizontally, at right angles to the incident rays, and parallel to the surface of the base plate or partition 19.

From the pre-objective prism 1 the horizontal rays are projected through the objective lens 10 to the reflecting surface of the post-objective prism 2 where they are projected vertically downward through the opening 37 in partition 19 to deflecting prism 3 attached to the lower side thereof.

Prisms 1 and 2 are mounted in support members which are of like construction and designed to clamp the prisms and retain them rigidly in fixed positions.

These support members have a substantially rectangular base 38 provided with a centrally located opening 39, and an end wall 40, which projects at a right angle to said base, extends to one-half the height of the prism, and is provided with a semi-circular opening, which allows passage of light to or from the reflecting surface of the prism. The right angular walls of the support are adapted to contact the corresponding walls of a prism and the prism is retained within the support by means of a spring-pressed plate 41 which is slidably mounted between end plates 42 attached to both the base 38 and end wall 40. The end plates 42 are connected at their outward extremities to a cross member 43. A spring 44 which is attached to the inner surface of the cross member is adapted to exert pressure upon the pressure plate 41 and thereby retain the prism tightly within the support.

Post-objective prism 2 reflects the rays from the objective lens 10 vertically downward through an opening 37 in the partition to reflecting prism 3 which is mounted on the under side of the partition.

The deflecting prism 3 on the lower side of the partition 19 is mounted in a triangularly shaped housing 45 which comprises a base plate 46 provided with a central circular opening 46', a front plate 47 having a central circular opening 47', triangularly-shaped side-walls 48, and an oblique cover 48'. The prism 3 is completely enclosed by the housing 45, except for the circular openings in the base and front plate thereof.

The prisms 4 and 5 are mounted adjacent the ends of a focusing lens assembly base plate 49. The focusing lens prism 4 is mounted between two perpendicularly extending walls 50 and 51 which are attached to said plate 49 and are provided with circular openings 50' and 51'. The prism is held in place by a cover 52 which is secured to the base plate 49.

Ocular deflecting prism 5 is mounted between the base plate 49 and a perpendicularly extending wall 53 which are provided respectively with circular openings 49' and 53'. The prism is retained to the base 49 by a cover 54.

All prisms in the lower compartment are attached to the under side of the partition 19 and are enclosed in housings similar to the type described above.

Deflecting prism 3 is mounted directly below post-objective prism 2 and functions to reflect the perpendicular downwardly directed beam from prism 2 in a horizontal direction and perpendicularly to the optical axis of the objective lens 10, and into prism 4 wherein the direction of said beam is reflected horizontally and parallel to the optical axis of the objective lens and into the ocular deflecting prism 5.

Within prism 5 the rays are reflected perpendicularly into ocular prism 6, and from prism 6 the rays enter the lenses 14 and 15 of the ocular or eyepiece.

Ocular prism 6, which is located in the upper compartment, is mounted upon a base plate 55 having a circular opening 55'. The plate is bent at right angles at its forward end to form an upright plate 56 which is provided with a circular opening 56', to receive the eyepiece 11.

Attached to the base plate 55 above the opening 55' is a channel member 57 which is provided with a central circular opening 57' registering with the opening 55' in the base 55. The channel member 57 functions to support a housing 58 for the prism 6. An opening 58' is provided in front wall 59 of the housing to allow passage of the rays to the eyepiece. The prism 6 is held in place by a cover plate 60 which extends over the reflecting surface of the prism.

The openings 49' and 55' register with the opening 19' in the partition 19.

The focusing lens 12 is mounted in a rectangular frame 61 which, adjacent its upper edge, is provided with sleeve members 62, the sleeves being in slidable engagement on parallel rods 63 which are attached to the walls 51 and 53 of the housings for prisms 4 and 5. At the lower edge of the frame is attached a plate 64 which is drilled and tapped to engage a threaded shaft 65 rotatably mounted in bearings 66 attached to the walls 51 and 53 of the housings for prisms 4 and 5.

One end of the shaft 65 projects through a circular opening 67 in the lower portion of the casing 26, and to this end is rigidly attached a turning knob 68. By turning this knob in either direction the shaft is revolved and the frame of the focusing lens moved longitudinally either toward prism 4 or prism 5 to focus the object viewed.

It will be noted that in the construction of the housing the optical axis of the objective lens 10 crosses the optical axis of the ocular and that a nodal point of the system coincides with the eyepoint on the optical axis of the ocular. This alignment is possible owing to the construction of the housing which is provided with a narrow portion at the location of the eyepiece. The narrow portion of the housing allows the face of the observer to project within the cutout area of the housing to the left of the oblique portion 69 of the walls 20 and 27 of the upper and lower covers 25 and 26. The construction as set forth also permits the use of larger prisms and objective lens in the upper compartment without interfering with the desired alignment of the elements of the optical system. The construction also makes it possible to align the focusing shaft 65 so that the adjusting knob 68 projects from the side of the instrument where it may be easily operated by hand.

The instrument may be equipped with a socket 70 for support upon a tripod, Jacob staff or other rest to relieve the arms for extended observation.

The operation of the instrument is indicated mainly by the foregoing description and the travel of optical observance can be followed through on the arrowed lines in Figure 13.

As stated above the instrument is so constructed that the eyepoint on the optical axis of the ocular and a nodal point of the system are substantially brought into coincidence so that angular movements of the system (within the limits of the field of view) will cause no movement of the image, and lateral displacement of the system is, in most cases, too small to be discernible. However, other arrangements and variations in the type of reflectors and other elements of the optical system may also be used in proper coordinated relationship with the elements described.

It is also not essential that the intersection between the optical axis of the ocular at the eyepoint and the nodal point of the system be at right angles as shown, as variations in the direction of the optical axis would not affect the general construction of the apparatus.

A modified binocular form of the device is illustrated in Figs. 14 to 20, inclusive, in which a binocular construction having a pupillary adjusting device for varying the distance between the eyepieces is shown.

The structure in general is that of a double housing each side (70 and 70') of which is similar to the housings shown in the previous figures, but of right and left construction, and symmetrically arranged on either side of a central plane.

The binocular construction contains optical systems, similar to that shown in Fig. 13, symmetrically arranged within either side of the double housing. These optical systems include the eyepiece 71 with prisms 75 and 76 and eyepiece 11' with prisms 75' and 76' are supported respectively by frames 78 and 78' which are slidably mounted in openings 79 and 79' in the partitions 80 to allow lateral movement thereof within said housing.

The eyepieces 71 and 71' of these optical systems are slidably mounted within the housing to allow for pupillary adjustment thereof, which is effected by an adjusting mechanism, said adjusting mechanism includes a pinion 81 mounted on a pinion shaft 82 which is rotated by the knurled knob 83 having a pointer 84 adapted to indicate on the dial 85 the degree of separation of the eyepieces.

The pinion 81 meshes with gears 86 and 86' each of which is provided with an eccentrically located circular opening in which are fitted cam members 87 and 87'. These cam members are attached to the eyepieces and are provided with projections on either side thereof which contact said central openings and thus provide for the lateral movement of the eyepieces with the rotation of the gears.

With this device the pupillary distance between the eyepieces may be adjusted to the vision of the observer, and when said distance is changed to accommodate an observer, the eyepieces may be reset to their former distance of separation by moving the pointer to the former setting on the dial.

The system as described herein therefore has the following advantages:

An instrument embodying this invention will not be affected by tremor or vibration of the instrument. It will permit the employment of higher powers without external support and it will permit observation over extended periods with less eyestrain and fatigue.

In the claim the term "axis," as applied to the entrance tube or sunshade, objective and eyepiece, means the central or principal axis of the elements referred to.

It is therefore appreciated that the construction of the equipment and the arrangement and type of optical elements and system thereof may be varied in many ways in order to produce the effects of coincidence and stability anticipated and feasible in the light, image or rays transmitted without departing from the principles of the invention and coming within the scope and spirit thereof.

Having thus described my invention, what I claim as new and wish to secure by Letters Patent is:

An optical instrument comprising, in combination, a housing composed of top and bottom sections, a central partition having openings therein and interposed between said sections to separate said sections into upper and lower compartments, an entrance tube mounted in the wall of said upper section with its axis parallel to said partition, an eyepiece located on the wall of said top section opposite said tube and with its axis laterally spaced from and parallel with said tube, a reflector in said upper compartment for reflecting said incoming rays at right angles to the axis of said tube and parallel to said partition, a second reflector located within the upper compartment for directing the rays from said first reflector through an opening in said partition into said lower compartment, an objective lens located within said upper compartment intermediate said first and second reflectors, a third reflector in the lower compartment for receiving rays reflected downwardly from said second reflector and directing the same along an axis parallel to the axis of said tube, a fourth reflector within the lower compartment for directing the rays from said third reflector along an axis parallel to the rays through said objective lens, a focusing lens in said lower compartment for receiving rays from said fourth reflector, means for focusing said lens, a fifth reflector within said lower compartment for reflecting rays from said focusing lens upwardly through an opening in said partition into said upper compartment, and a sixth reflector in said upper compartment for reflecting the rays from said fifth reflector to said eyepiece to thereby present a view of an object sighted, said eyepiece having its axis normal to the axis of said objective, said eyepiece and objective lying upon opposite sides of a plane through the axis of said tube normal to the axis of said objective, said eyepiece being closely adjacent to the axis of said objective.

MERRIFIELD G. MARTLING.

REFERENCES CITED

The following references are of record in the file of this patent:

UNITED STATES PATENTS

| Number | Name | Date |
|---|---|---|
| 451,134 | Riddle | Apr. 28, 1891 |
| 898,653 | Jacob | Sept. 15, 1908 |
| 1,607,688 | Perrin et al. | Nov. 23, 1926 |
| 1,649,303 | Glessner | Nov. 15, 1927 |
| 1,837,207 | Cover | Dec. 22, 1931 |
| 2,238,118 | Langsner | Apr. 15, 1941 |

FOREIGN PATENTS

| Number | Country | Date |
|---|---|---|
| 89,338 | Germany | Nov. 6, 1896 |
| 14,102 | Great Britain | Apr. 9, 1898 |
| 287,842 | Germany | Oct. 8, 1915 |